United States Patent [19]

Hoffelner

[11] Patent Number: 4,563,815
[45] Date of Patent: Jan. 14, 1986

[54] DEVICE FOR CUTTING THROUGH AUTOMOBILE BELTS WITH A KNIFE

[76] Inventor: Volkwin Hoffelner, Hötzendorfergasse 10A, A-3423 St.Andrä-Wördern, Austria

[21] Appl. No.: 632,888

[22] Filed: Jul. 20, 1984

[51] Int. Cl.⁴ .......................... B26B 29/02; B60R 7/08
[52] U.S. Cl. ..................................... 30/296 A; 30/294; 224/311
[58] Field of Search .................... 30/294, 289, 296 R, 30/296 A, 151; 224/232, 247, 311

[56] References Cited

U.S. PATENT DOCUMENTS

| 254,243 | 2/1980 | Florian | 30/294 X |
| 814,153 | 3/1906 | Myer et al. | |
| 4,062,117 | 12/1977 | Coleman | 30/294 |
| 4,100,652 | 7/1978 | Carlson | 224/247 |
| 4,134,206 | 1/1979 | Beermann | 30/294 |

FOREIGN PATENT DOCUMENTS 310152 4/1929 United Kingdom .
336898 10/1930 United Kingdom .

Primary Examiner—Jimmy C. Peters
Attorney, Agent, or Firm—Fleit, Jacobson, Cohn & Price

[57] ABSTRACT

In a device for cutting through automobile belts with a knife, a holder (5) is provided at the lower rim of the window opening of the automobile door and the knife (12) is slidably fitted and held in said holder to extend above the inner upper edge of the lower rim of the window opening. The knife (12) consists of a handle plate (20) and a blade (21), which is protected from being touched in that it is accommodated in a slot (18) extending from the edge of the handle plate (20).

8 Claims, 3 Drawing Figures

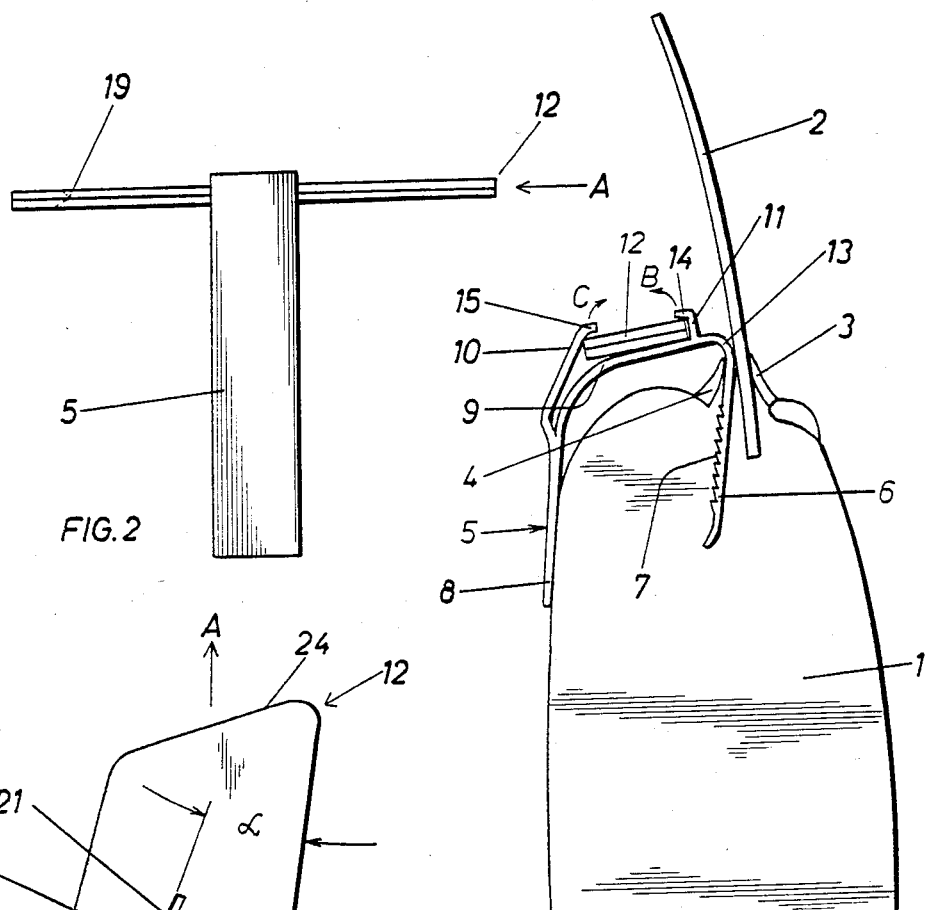
FIG.1
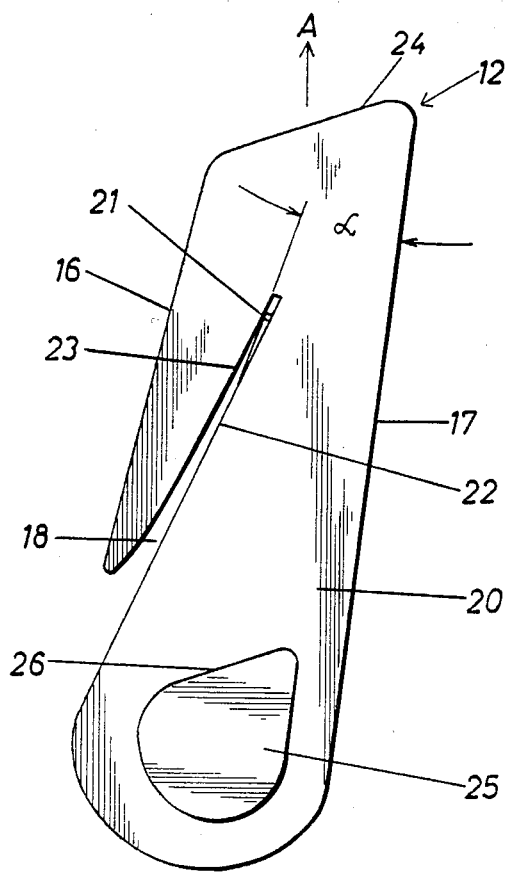
FIG.2
FIG.3

DEVICE FOR CUTTING THROUGH AUTOMOBILE BELTS WITH A KNIFE

SUMMARY OF INVENTION

In a device for cutting through automobile belts, a holder is provided at the lower rim of the window of the automobile door. The knife for cutting through the belts is slidably fitted in said holder and provided with a protected blade.

This invention relates to a device for cutting through automobile belts with a knife. Such action is often required after an automobile accident, when the driver or a passenger cannot free himself from the belt by an actuation of the conventional unlatching mechanism.

British Patent Specification No. 310,152 describes a so-called thread cutter, in which a razor blade is held between two metal plates so that the knife edge of the blade extends obliquely at one end of one of the metal plates and said one metal plate has a reversely bent end portion covering that portion of the knife edge that is disposed outside the slot, for reasons of safety. That device is mainly intended for severing strings attached to parcels or the like. The metal plates are held together by a protruding bolt so that the handling is rendered more difficult. Besides, there is a risk of injury because one metal plate has a pointed end forming the slot. For these reasons it is believed that such device cannot properly be used to cut through automobile belts.

In accordance with the invention a holder is provided at the lower rim of the window opening of the automobile door, the knife is slidably fitted in said holder to extend above the inner upper edge of the lower rim of the window opening, and the window consists of a handle plate and a blade, which is protected from being touched in that it is accommodated in a slot extending from the edge of the handle plate.

In case of need, the knife can easily be taken from the holder and can properly be used without risk of injury. The holder is so designed that the device in accordance with the invention can be mounted on an existing vehicle at any time.

Further details of the invention will be explained more fully with reference to the drawing, which shows an embodiment of the invention.

FIG. 1 is a transverse sectional view showing an automobile door in which the device has been installed.

FIG. 2 is a side elevation showing the clip with the belt-cutting knife inserted therein.

FIG. 3 is a top plan view showing the knife.

In accordance with FIG. 1 a window 2 is slidably mounted in an automobile door 1 and is adjustable in known manner by known means, which are no part of the invention. An outer window seal 3 and an inner window seal 4 prevent an ingress of rainwater from the outside of the door or of condensate from the inside of the window into the interior of the automobile door. A holder 5 is provided, which is substantially channel-shaped and consists preferably of plastic. One flange 6 of the holder is inserted into the automobile door between the seal 4 and the window 2. On the inside of that flange 6, facing away from the window, the holder 5 is provided with teeth 7, which preferably consist of sawteeth and face upwardly and prevent the clip from being taken along when the window is being wound up. In position for use, the other flange 8 engages the outside surface of the inner wall of the automobile door 1. Adjacent to its web 9, the holder comprises two spaced apart lugs 10, 11, between which the belt-severing knife 12 is held.

In position for use, the web 9 of the holder 5 is downwardly inclined toward the interior of the vehicle so that the holder will not obstruct in any way the view of the driver toward the side and will not adversely affect the attractive appearance of the door. But in case of an accident the web 9 will be seen immediately by a rescuing person who has approached the window. The flange 6, which on its inside carries the teeth 7, is also downwardly inclined from that web 9 toward the inside of the automobile door 1 so that the two flanges 6, 8 of the channel converge.

That lug 11 which is nearer to the window 2 adjoins a rounded portion 13, which faces the window and constitutes a transition from the web 9 of the holder 5 to its flange 6. The height of the lug is substantially as large as the thickness of the belt-severing knife 12. The lug 11 comprises a beaklike end portion 14, which is bent toward the lug 10 so that the lug 11 engages and slightly extends over the side edge of the belt-severing knife. The opposite lug 10 extends from the flange 8 of the holder 5 and is longer than the lug 11 so that the lug 10 can more easily be bent in a lateral direction from the flange 8 than the lug 11. Just as the end 14, the end 15 of the lug 10 is beak-shaped and laterally bent toward the end 14 and the two ends 14, 15 lie in a plane which is parallel to the web 9.

Owing to this design of the lugs 10, 11, the belt-severing knife 12 can be slidably inserted into the holder 5 from the side in the direction of the arrow —A— and the knife can be removed from the holder 5 either in that the knife is pulled opposite to the direction of the arrow —A— or in that it is pivotally moved in the direction of either of the arrows —B— or —C—. For this reason, the knife can easily be removed from the holder 5 in case of danger and can also be removed in the direction of the arrow —A—. The shape of the knife 12 is apparent from FIG. 3 and will be described more fully hereinafter.

The belt-severing knife 12 consists of a handle 20 and a knife edge or sharp blade 21, which may be made of any desired material and preferably consists of a razor blade. The handle 20 consists essentially of an elongate plate having approximately parallel sides 16, 17 and an oblique slot 18, which extends from one of the sides 16, 17, in the present case from the side 16, and has at its inner end 19 an end wall, which merges into the upper and lower surfaces of the handle 20, as is indicated in dotted lines in FIG. 2. The side walls 22, 23 of the slot 18 are generally parallel to each other. Only the end portion of the wall 23 diverges outwardly from the wall 22 so that the slot 18 flares outwardly only in that region to facilitate the introduction of the automobile belt which is to be severed. The slot 18 extends at a steeper angle to the side wall 17 than the knife edge 21, which also forms an acute angle with the side wall 17. The knife edge or blade 21 is embedded in the wall of the handle 20 and is accessible only at a narrow strip, which corresponds, at most, to the width of the slot 18. As a result, an injury of the user of the belt-severing knife is precluded.

To facilitate the insertion of the knife 12 into the holder 5, the knife is beveled at its end opposite to the end of the slot and the beveled surface 24 forms an acute angle with the side wall 17. At its other end, the handle 20 has an opening 25 for receiving a finger of the hand of the user of the knife. The opening is substantially circular at the end and is approximately congruent with the end of the handle. The inside of the opening 25 is defined by an oblique wall 26, which is substantially parallel to the oblique wall 24. Owing to that design the belt-severing knife is handy and can easily be used. This is of special importance in case of danger.

It will be understood that various changes in design and further features may be adopted within the scope of the invention. For instance, a snap fastener may be provided to prevent an unintended falling of the belt-severing knife 12 out of the holder 5 when the vehicle is traveling on uneven roads. Such fastener may consist of a boss provided on the inside preferably of the lug 11 and an indentation, which receives the boss and is formed in that wall portion of the handle 20 that is opposite to the inserted knife.

What is claimed is:

1. A device for cutting through automobile safety belts with a knife, said device comprising:

a holder including a pair of spaced flanges to engage a portion of a vehicle door between a window and an inner door surface, a web extending between said flanges, a pair of spaced, upwardly protruding lugs extending from said holder and terminating in inwardly facing, spaced end portions to define with said web a knife-receiving opening;

a substantially planar knife adapted to be slidably received in said knife-receiving opening, said knife including a handle having a side wall and a slot positioned obliquely relative to said side wall and having an opening to receive an automobile safety belt, said slot including a knife edge positioned at an inner portion thereof to permit the cutting of an automobile safety belt, said knife edge being removable from said holder.

2. A device according to claim 1 wherein said web in position for use is downwardly inclined toward the interior of the vehicle.

3. A device according to claim 2, wherein one flange is adapted to be inserted between a window pane and a window seal and is provided on an inside surface with inclined sawteeth that extend upwardly toward said web.

4. A device according to claim 2, wherein the flanges of the holder converge.

5. A device according to claim 2, wherein one lug is remote from the windowpane and is longer than the other lug and extends from that flange of the holder which in position for use engages the inner surface of the automobile door, and the end portions of the lugs are bent toward each other and extend in a plane which is parallel to the plane of the web of the holder.

6. A device according to claim 5, wherein the handle of the knife includes a finger-receiving opening at that end which is nearer to the slot opening for receiving a finger of a hand of a user and the other end of the handle is tapered relative to said side wall to facilitate positioning of the knife in said knife-receiving opening in the holder.

7. A device according to claim 1, wherein the slot flares outwardly toward an end of the handle and has an inner portion defined by a pair of parallel walls.

8. A device according to claim 7, wherein the handle of the knife includes a finger-receiving opening at that end which is nearer to the slot opening for receiving a finger of a hand of a user, and the other end of the handle is tapered relative to said side wall to facilitate positioning of the knife in said knife-receiving opening in the holder.

* * * * *